350-96.2
6/16/81    OR    4,273,413    SR

United States Patent [19]
Bendiksen et al.

[11] 4,273,413
[45] Jun. 16, 1981

[54] PHOTOELECTRIC ELEMENT/OPTICAL CABLE CONNECTOR

[75] Inventors: Leonard F. Bendiksen, Harrisburg; William L. Schumacher, Camp Hill, both of Pa.

[73] Assignee: AMP Incorporated, Harrisburg, Pa.

[21] Appl. No.: 15,254

[22] Filed: Feb. 26, 1979

[51] Int. Cl.³ .............................................. G02B 5/14
[52] U.S. Cl. ................... 350/96.20; 250/227
[58] Field of Search ............... 350/96.15, 96.16, 96.17, 350/96.20, 96.21, 96.22; 250/227; 357/17, 30, 72, 74

[56] References Cited
U.S. PATENT DOCUMENTS

| | | | |
|---|---|---|---|
| 3,414,733 | 12/1968 | Wunderman | 350/96.20 X |
| 3,423,594 | 1/1969 | Galopin | 250/227 X |
| 3,878,397 | 4/1975 | Robb et al. | 250/227 X |
| 3,910,678 | 10/1975 | McCartney et al. | 350/96.21 |
| 3,914,015 | 10/1975 | McCartney | 350/96.22 |
| 3,922,064 | 11/1975 | Clark et al. | 350/96.22 |
| 3,946,416 | 3/1976 | Hacskaylo | 357/17 |
| 3,995,935 | 12/1976 | McCartney | 350/96.15 |
| 3,999,837 | 12/1976 | Bowen et al. | 350/96.22 |
| 4,033,668 | 7/1977 | Presby | 350/96.20 |
| 4,045,120 | 8/1977 | de Corlieu et al. | 350/96.15 |
| 4,075,477 | 2/1978 | Hanson | 250/227 |
| 4,081,208 | 3/1978 | Meade | 350/96.20 |
| 4,087,158 | 5/1978 | Lewis et al. | 350/96.21 |
| 4,113,346 | 9/1978 | Jackson et al. | 350/96.20 |
| 4,118,105 | 10/1978 | Voigt | 350/96.20 |
| 4,167,303 | 9/1979 | Bowen et al. | 350/96.21 |
| 4,186,995 | 2/1980 | Schumacher | 350/96.20 |
| 4,186,996 | 2/1980 | Bowen et al. | 350/96.20 |

FOREIGN PATENT DOCUMENTS

| | | | |
|---|---|---|---|
| 2541247 | 3/1977 | Fed. Rep. of Germany | 350/96.20 |
| 2618095 | 11/1977 | Fed. Rep. of Germany | 350/96.20 |

OTHER PUBLICATIONS

Schmid, "Fiber-Optic Data Transmission: A Practical, Low-Cost Technology", *Electronics*, Sep. 2, 1976, pp. 94–99.
Cefarelli et al., "Optical Circuit Module Connector", *IBM Tech. Discl. Bulletin*, vol. 21, No. 4, Sep. 1978, pp. 1568–1570.

*Primary Examiner*—John K. Corbin
*Assistant Examiner*—John D. Lee
*Attorney, Agent, or Firm*—Gerald K. Kita

[57] ABSTRACT

A low profile, sleeve form bushing is cast from metal and provides a coupling for an optical cable and a photoelectric element which is plugged into one end of the bushing and held in place with a press-on retention plate. A slotted flange on the bushing receives the rim of an inverted metal receptacle, placed over the photoelectric element to serve as a shielding cover at one end of the bushing. The other end of the bushing is of sleeve form, externally threaded to receive a threaded cap of a resilient ferrule connector.

8 Claims, 6 Drawing Figures

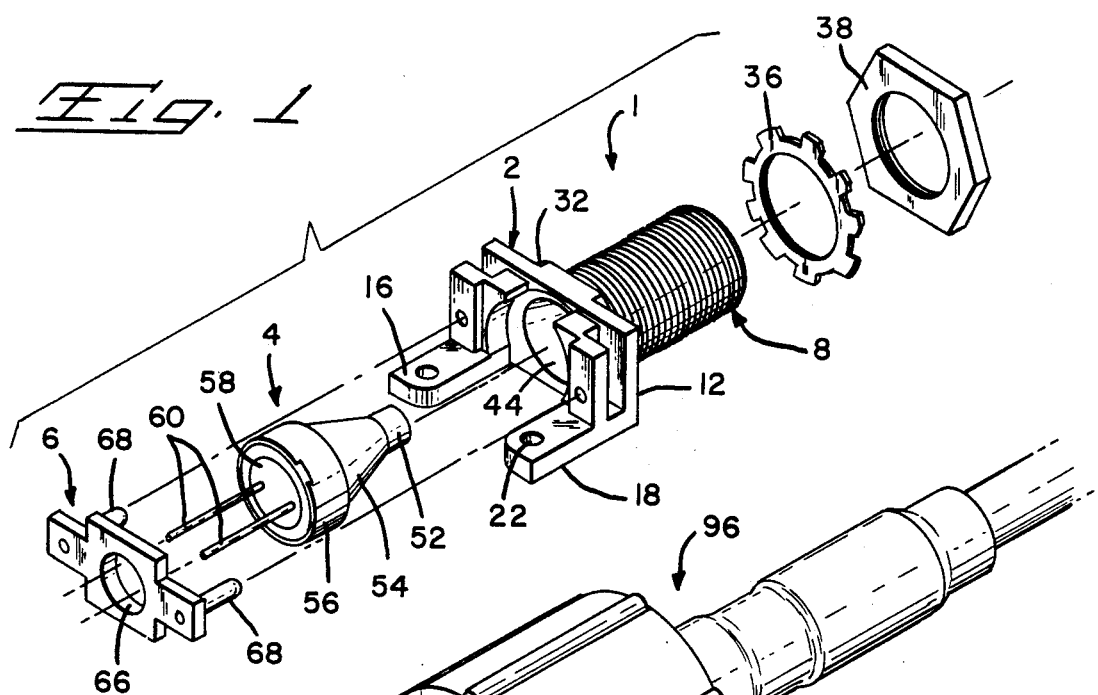
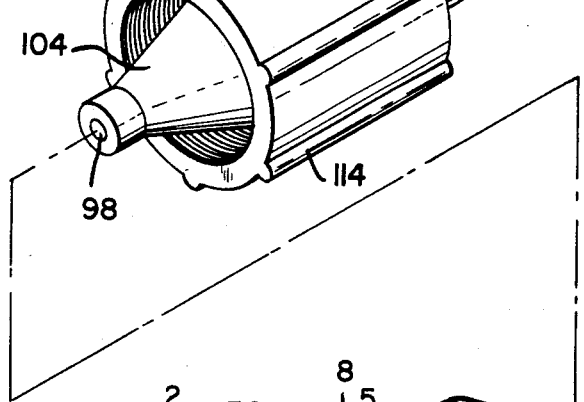
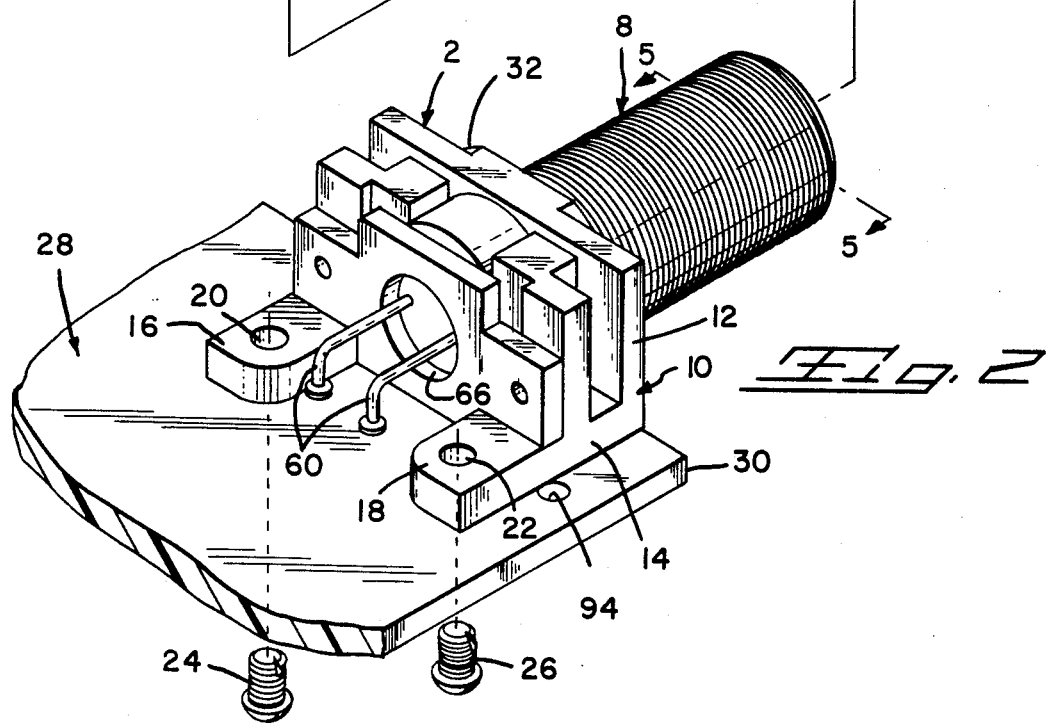

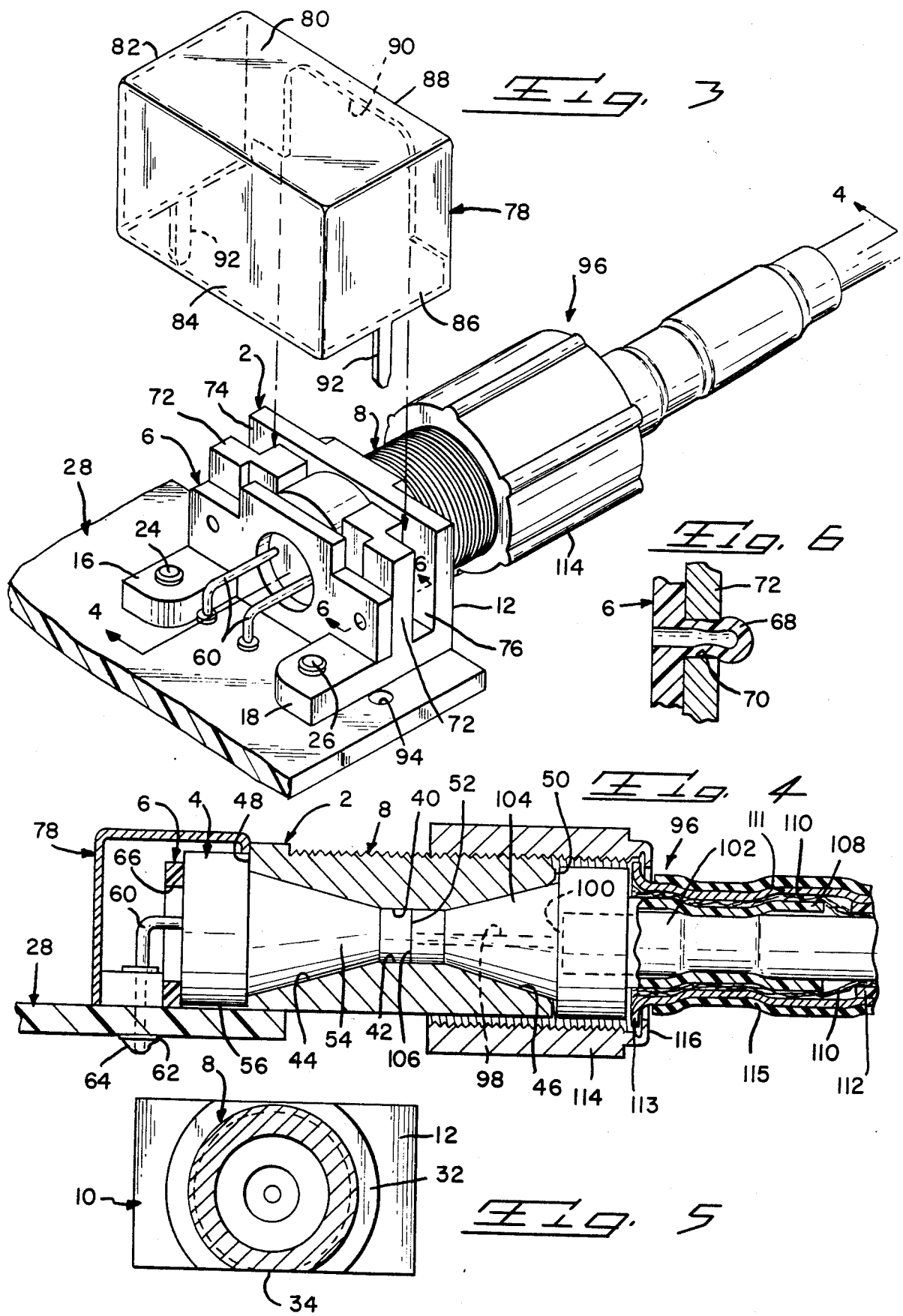

PHOTOELECTRIC ELEMENT/OPTICAL CABLE CONNECTOR

FIELD OF THE INVENTION

The invention relates to a connector for an optic transmission cable, and, more specifically, to a connector which couples an optic transmission cable to a photoelectric element of an electronic circuit.

BACKGROUND OF THE INVENTION

Optic cables are expected in the future to supplant electrical cables, since optic cable materials are cheaper, the power required to drive optic signals is lower, and the optic signals are less subject to attenuation or interference by external signals. An optic cable requires a connector which effectively couples the cable with electronic equipment and with electronic circuits internally of such equipment. The electronic circuits, being miniaturized, require a small size connector of low profile. The circuits are mounted on a circuit board and may require a connector which itself will mount directly on the board. Such a connector must be removably secured to a photoelectric circuit element which also is a part of the circuit mounted on the board. Metal shielding also is required at the connector to guard against cross talk and interference. A further feature which is met by the present invention is a requirement that the connector allow disconnect of the optic cable from the photoelectric element.

SUMMARY OF THE INVENTION

A connector of the present invention is in the form of a low profile bushing which can be mounted on an edge of a circuit board. The bushing incorporates a photoelectric element which also is mounted on the board. A press on retention plate is provided for holding the photoelectric element in one end of the bushing. A slotted flange on the bushing receives the rim of a deep, dish metal receptacle when placed inverted over the photoelectric element and against the circuit board. The receptacle thereby serves as a shielding cover at one end of the bushing. The bushing itself is cast from metal and serves thereby as additional shielding. The other end of the bushing is of sleeve form, flattened on one side to be low profile as it projects outwardly from an edge of the circuit board. The sleeve form is externally threaded to receive a threaded cap of a resilient ferrule connector of a type disclosed in U.S. Pat. No. 3,999,837.

OBJECTS

Accordingly, an object of the present invention is to provide a metal bushing of low profile for mounting on a circuit board and for providing a disconnect coupling between an optic transmission cable and a photoelectric element of an electronic circuit provided on the board.

Another object is to provide a metal bushing of low profile for mounting on an edge of a circuit board and for providing a disconnect coupling of an optic transmission cable and a photoelectric element of an electronic circuit mounted on the board, the bushing further incorporating a deep dish metal receptacle serving as a shielding cover at one end of the bushing.

Other objects and advantages of the present invention will become apparent from the following detailed description taken in conjunction with the accompanying drawings.

DRAWINGS

FIG. 1 is an exploded perspective of a preferred embodiment of the present invention.

FIG. 2 is an enlarged fragmentary perspective illustrating the component parts of FIG. 1 assembled and mounted on a circuit board, together with a connector for an optic cable.

FIG. 3 is a fragmentary enlarged perspective of the component parts of FIG. 2 in assembled configuration, together with a metal shielding cover in exploded configuration.

FIG. 4 is an enlarged elevation in section of the components illustrated in FIG. 3.

FIG. 5 is a front elevation taken along the line 5—5 of FIG. 2.

FIG. 6 is a fragmentary enlarged section of a mounting pin of a retention plate illustrated in FIGS. 1 and 2.

DETAILED DESCRIPTION

With more particular reference to FIG. 1 of the drawings, there is illustrated generally at 1 a connector for coupling an optic transmission cable to a photoelectric element of a circuit. The connector includes a cast metal body 2 and a resilient ferrule 4 containing a photoelectric element pluggable into the body 2. The resilient ferrule 4 is held in place by a retention plate 6.

FIG. 2 more particularly illustrates the body 2 as being of unitary construction having an externally threaded short sleeve portion 8 and a base portion 10, having a vertical wall portion 12 and a horizontal wall portion 14, joined perpendicular with the wall portion 12 and defining an L-shaped section. The bottom wall 14 is provided with a pair of lugs 16 and 18 having vertical apertures 20 and 22 therethrough threadably receiving bolts 24 and 26 which secure the body 2 on the surface of a circuit board 28 along an edge 30 thereof. FIG. 2 shows the sleeve 8 overhanging the edge 30.

As shown in FIGS. 2 and 5, the vertical wall 12 is provided with a projecting integral bezel 32 encircling the outer periphery of the externally threaded sleeve portion 8. The sleeve portion 8 has a flat side 34 devoid of the external threads. The mounting lugs mount the flat side of the sleeve coplanar with the top surface of the circuit board 28. The sleeve 8 thereby vertically projects with a low profile above the surface of the circuit board 28. The low profile is consistent with a need for miniaturization of the connector.

FIG. 1 illustrates in exploded configuration a lock washer 36 and a threaded nut 38 for receipt over the sleeve portion 8. The connector 1 is thereby adapted for a bulkhead mount. The sleeve portion 8 is passed through a hole in a bulkhead (not shown) with the hole sidewall closely excircling the bezel 32. The lock washer 36 and nut 38 are advanced along the sleeve portion 8, clamping the bulkhead between the vertical wall 12 and the lock washer 36. The bulkhead mounting feature is optional and may be eliminated.

As shown in FIG. 4, the sleeve portion 8 includes an internal profiled bore 40 therethrough having a reduced, right cylindrical central section 42 opening into frusto-conical tapered bore portions 44 and 46 communicating with opposite ends 48 and 50 of the body portion 2.

FIG. 1, taken in conjunction with FIG. 4, illustrates the resilient ferrule 4 as having a right cylindrical mating end 52, an adjacent frustoconical section 54 and an enlarged cylindrical opposite end 56. The ferrule 4 is molded of unitary plastics material and has a profiled bore therein into which a photoelectric device 58 is inserted, with the electrical leads 60 thereof protruding from the end 56. As illustrated, two electrical leads 60 indicate that the photoelectric device 58 is a photodiode. The photoelectric device may also alternatively comprise a phototransistor which has three electrical leads. Any type of photoelectric device may be mounted in the ferrule 4 with the electrical leads thereof protruding from the large end 56. Optical signals which emminate from, or are received by, the photoelectric device 58 are transmitted through the mating end 52 of the ferrule 4. One way to achieve such transmission is to provide a short length of optical waveguide within the profiled bore of the ferrule 4. One end of the waveguide is bonded to the photoelectric device 58 and the other end is polished flush with the end surface of the mating end 52. Accordingly, the ferrule 4 provides a preassembled module which may be electrically coupled by the electrical leads 60 at one end, and optically coupled by a short length of waveguide extending through to its opposite mating end 52. FIG. 4 illustrates the module inserted into the bore section 44 with enlarged end 56 stopped against the end wall 48. The electrical leads 60 are bent to project toward and through the circuit board 28. The leads 60 project through the thickness of the board 28 and through plated circuits, one shown at 62, on the inverted surface of the board. A quantity of solder 64 electrically secures each of the leads 60 to corresponding circuits 62.

The leads 60 freely pass through an enlarged aperture 66 centrally of the retention plate 6. FIGS. 1 and 6 illustrate the plate 6 as having a pair of horizontally projecting hollow pins 68 which are resiliently radially compressed when press fit into corresponding apertures 70 of a pair of vertical posts 72 integral with the body 2 and spaced slightly from the wall portion 12 to define vertically accessible slot portions 74 and 76. FIG. 3 illustrates an inverted metal receptacle 78 having a top wall 80 and side walls 82, 84, 86, and 88. The side wall 88 is provided with a doorway shaped opening 90 therein. The sidewalls 82 and 86 are provided with integral depending legs 92 for pluggable entry within corresponding openings 94 in the circuit board 28. The doorway opening 90 is received over the body portion 2 with the remainder of the side wall 88, on either side of the opening 90, being vertically received into the vertically accessible slots 74 and 76. The receptacle 78 thereby provides a shielding cover and receptacle at one end of the body 2. As shown, the cover size allows for electrically shielding only the leads 60. A metal receptacle 78 is commonly referred to in the art as a "can", and is commercially available in various sizes to be used as a shielding cover for electronic components mounted on the board 28 in addition to the leads 60.

FIGS. 2, 3, and 4 illustrate generally at 96 a resilient ferrule connector for a single fiber, optic cable. More particularly, the optic cable includes a central optical conductor 98 protruding from an end 100 of an inner jacket 102. The conductor 98 passes through a frustoconical portion of a resilient ferrule 104 and is polished flush with a reduced, right cylindrical mating end 106 of the ferrule. A ferrule sleeve portion 108 overlies the inner jacket 102. Strands of strength fibers 110 of the cable protrude from an outer jacket 112 of the cable and are located between the sleeve 108 and an outer metal sleeve 111. The sleeves are radially compressed to grip the strands 110 and to radially crimp the inner sleeve 108 into gripped radial compression on the inner jacket 102. A plastic or rubber sleeve 115 covers the sleeve 111. The outer sleeve 111 has a flared end 113 which is received within one end of an internally threaded metal cap 114. A radially inwardly directed flange 116 of the cap bears axially lengthwise of the cable against the flared sleeve end 113. As the threaded cap is advanced threadably along the sleeve portion 8 of the body 2, the cable and ferrule are advanced into the end 50 of the sleeve portion 8. The two ferrules thereby will be aligned within the profiled bore 40, optically coupling the optical conductor 98 with the photoelectric device within the ferrule 4. The coupling repeatedly may be disconnected and connected by use of the threaded cap 114.

Although preferred embodiments of the present invention are disclosed, other embodiments and modifications which would be apparent to one having ordinary skill in the art are intended to be covered by the spirit and scope of the appended claims.

What is claimed is:

1. In a connector for optically coupling an optic transmission cable and a photoelectric element of an electronic circuit, the improvement comprising:
   a metal body having a base portion constructed for mounting on a surface of a circuit board,
   a sleeve portion of said body having a flattened portion for association coplanar with said a surface of a circuit board on which said body is mounted to provide a low profile for said body, said sleeve portion having a profiled bore therethrough,
   a photoelectric element mounted in a first resilient ferrule with electrical leads protruding from said ferrule for pluggable connection in a circuit board on which said body is mounted, said ferrule being received in one end of said profiled bore,
   means for retaining said ferrule in said bore,
   said sleeve being externally threaded to receive a threaded cap rotatably mounted on a second resilient ferrule provided at the end of an optic cable and pluggably received in said profiled bore and optically coupling said optic cable and said photoelectric element.

2. The structure as recited in claim 1, wherein, said means includes a plate with a pair of hollow cylindrical pins which press fit within an aperture of a portion of said body.

3. The structure as recited in claim 1, wherein, said means includes an aperture receiving said leads therethrough.

4. The improvement as recited in claim 1, and further including:
   a deep metal receptacle inverted over said leads, and said body including a slot receiving a rim of said receptacle.

5. The improvement as recited in claim 1, and further including: mounting lugs which are integral with said body and which mount the flattened portion of said sleeve overhanging an edge of a circuit board while coplanar with a surface of said circuit board.

6. The improvement as recited in claim 1, wherein said means includes a plate secured to said body and engaging and retaining that portion of said first resilient ferrule which is stopped against said body.

7. The improvement as recited in claim 6, wherein said plate includes an opening through which said leads project, and a metal receptacle is inverted over said leads and said plate.

8. A bushing connector for coupling an optic transmission cable and a photoelectric element of an electronic circuit, comprising:
  a metal body having a portion in the form of a sleeve and another portion serving as a base,
  means on said base for securing the same to a circuit board,
  said sleeve having a profiled bore therethrough,
  said sleeve including an integral flange having vertical slots for receiving the rim of a deep metal receptacle,
  a photoelectric element mounted in a resilient ferrule with electrical leads protruding from said ferrule,
  said ferrule pluggably received in one end of said sleeve,
  means for retaining said ferrule in said sleeve, said sleeve being externally threaded to receive a threaded cap rotatably mounted on a second resilient ferrule provided on the end of an optic cable and pluggably received in said sleeve adjacent to and in alignment with said photoelectric element, and
  said sleeve is flat on one side with a bezel encircling said externally threaded portion.

* * * * *